(12) United States Patent
Attebury et al.

(10) Patent No.: US 11,697,193 B2
(45) Date of Patent: Jul. 11, 2023

(54) PORTABLE CYLINDER ASSEMBLY TORQUE TOOL

(71) Applicant: American Airlines, Inc., DFW Airport, TX (US)

(72) Inventors: Randal L. Attebury, Tulsa, OK (US); Tommy D. Teague, Sand Springs, OK (US); Hiramn B. Fernandez, Tulsa, OK (US)

(73) Assignee: American Airlines, Inc., DFW Airport, TX (US)

( * ) Notice: Subject to any disclaimer, the term of this patent is extended or adjusted under 35 U.S.C. 154(b) by 0 days.

(21) Appl. No.: 17/672,615

(22) Filed: Feb. 15, 2022

(65) Prior Publication Data
US 2022/0184777 A1  Jun. 16, 2022

Related U.S. Application Data

(60) Division of application No. 14/584,953, filed on Dec. 29, 2014, now Pat. No. 11,247,312, which is a division of application No. 13/922,035, filed on Jun. 19, 2013, now Pat. No. 8,919,226, which is a continuation of application No. 12/728,397, filed on Mar. 22, 2010, now Pat. No. 8,479,617.

(51) Int. Cl.
| | |
|---|---|
| *B25B 13/50* | (2006.01) |
| *B25B 13/02* | (2006.01) |
| *B25B 13/48* | (2006.01) |
| *B23P 15/00* | (2006.01) |
| *B25B 13/06* | (2006.01) |
| *B25B 13/04* | (2006.01) |

(52) U.S. Cl.
CPC .............. *B25B 13/50* (2013.01); *B23P 15/00* (2013.01); *B25B 13/02* (2013.01); *B25B 13/065* (2013.01); *B25B 13/48* (2013.01); *B25B 13/04* (2013.01); *B25B 13/06* (2013.01); *Y10T 29/49* (2015.01); *Y10T 29/49948* (2015.01)

(58) Field of Classification Search
CPC ....... B25B 13/50; B25B 13/065; B25B 13/48; B25B 13/04; B25B 13/06; B23P 15/00; Y10T 29/49; Y10T 29/49948
USPC ....... 81/176.15; 137/81.1, 15.01; 128/205.24
See application file for complete search history.

(56) References Cited

U.S. PATENT DOCUMENTS

| | | | |
|---|---|---|---|
| 7,788,995 B2 * | 9/2010 | Nicolazzo | F16L 41/021 |
| | | | 81/124.2 |
| 2007/0028726 A1 * | 2/2007 | Kunkel | B25B 13/50 |
| | | | 81/176.15 |

* cited by examiner

*Primary Examiner* — Katina N. Henson
(74) *Attorney, Agent, or Firm* — Pramudji Law Group PLLC; Ari Pramudji

(57) ABSTRACT

A tool for torquing a regulator onto a cylinder of a portable cylinder assembly. The tool includes a nut and a socket. The nut is configured to fit around a body of a regulator of a portable cylinder assembly. As such, the nut has a first set of grooves that avoids one or more valve assemblies on the body of the regulator. The socket has a cavity extending therethrough such that the cavity consists of three sections: a top section, a middle section and a bottom section. The top section of the socket is configured to be coupled to a device that applies a torque force on the socket. The middle section of the socket is configured to avoid a case of the regulator which is disposed above the body of the regulator. The bottom section of the socket is configured to be coupled to the nut.

20 Claims, 8 Drawing Sheets

PORTABLE CYLINDER ASSEMBLY TORQUE TOOL

RELATED APPLICATIONS

This application is a divisional application of U.S. patent application Ser. No. 14/584,953, filed Dec. 29, 2014, now issued as U.S. patent application Ser. No. 11/247,312, which is a divisional application of U.S. patent application Ser. No. 13/922,035, filed Jun. 19, 2013, now issued as U.S. Pat. No. 8,919,226, which is a continuation of U.S. patent application Ser. No. 12/728,397, filed Mar. 22, 2010, now issued as U.S. Pat. No. 8,479,617. The entire disclosure of each is incorporated herein by reference.

BACKGROUND

Field of the Invention

Implementations of various technologies described herein generally relate to a tool that may be used to torque a portable cylinder assembly.

Description of the Related Art

The following descriptions and examples do not constitute an admission as prior art by virtue of their inclusion within this section. Typically, in aircrafts, portable cylinder assemblies are used to store oxygen for breathing in case of an emergency, such as when the aircraft's cabin decompresses above a predetermined altitude. The portable cylinder assemblies generally contain pressurized gaseous oxygen. In operation, the portable cylinder assembly provides oxygen by way of an operating head or regulator. The regulator is composed of two portions: a body and a case. The case is disposed above the body. The body typically includes a number of valves protruding outward therefrom. One set of valves may be configured to release oxygen, while another set may be used to reduce pressure in regulating the amount of oxygen being released.

Certain government regulations may require the body of the regulator to be coupled to the cylinder portion of the portable cylinder assembly at a specific torque value. However, the case of the regulator may also be required to be coupled to the body of the regulator at a specific torque value. Due to the positioning of the body of the regulator with respect to the case of the regulator and the cylinder portion in addition to the number of valves protruding out from the body, it may be difficult to torque the body of the regulator to the cylinder portion without altering the coupling between the case of the regulator and the body of the regulator.

SUMMARY

Described herein are implementations of various technologies of a portable cylinder assembly torque tool. In one implementation, the portable cylinder assembly torque tool may include a nut and a socket. The nut is configured to fit around a body of a regulator of a portable cylinder assembly. As such, the nut includes a set of grooves that avoids one or more valve assemblies on the body of the regulator. The socket has a cavity extending therethrough such that the cavity consists of three sections: a top section, a middle section and a bottom section. The top section of the socket is designed to be coupled to a device that may be used to apply a torque force on the socket. The middle section of the socket is designed to avoid a case of the regulator which is located above the body of the regulator. The bottom section of the socket is designed such that it may be coupled to the nut.

Described herein are also implementations of various techniques for torquing a regulator onto a cylinder of a portable cylinder assembly. In one implementation, the method may include coupling a nut to a body of the regulator, coupling a socket to the nut such that the socket avoids the case of the regulator, and coupling a device to the socket. The device is configured to apply a torque force on the socket. The method may further include applying a torque force on the socket using the device.

Described herein are also implementations of various techniques for manufacturing a socket for torquing a body of a regulator of a portable cylinder assembly. The method may include creating a cavity through a socket and defining a hole at a top section of the cavity such that the hole is configured to be coupled to a device that may be used to apply a torque force on the socket. The method may then include defining a middle section of the socket having an inner wall radius larger than a radius of a case of the regulator and defining a bottom section of the socket having an inner wall configured to mate with an outer wall of a nut.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1A:
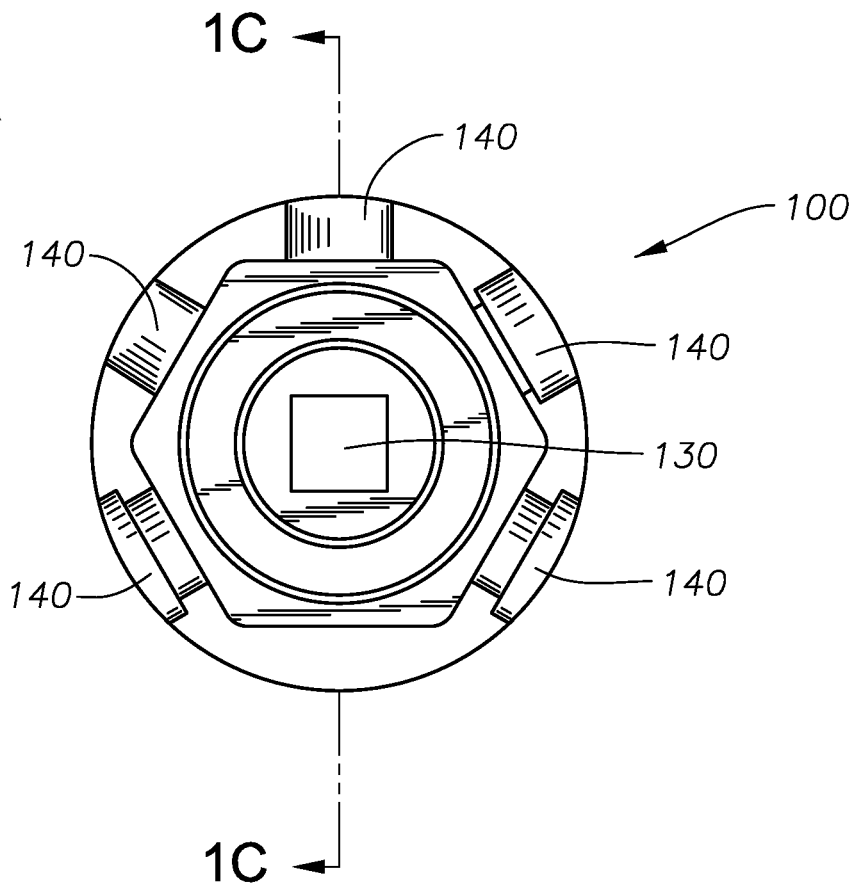
FIG. 1A illustrates a bottom view of a socket for a portable cylinder assembly torque tool in accordance with implementations of various technologies described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description or summary of various technologies and techniques directed at a portable cylinder assembly torque tool and a method for using the portable cylinder assembly torque tool to couple a regulator onto the portable cylinder without altering the torque value between the case of the regulator and the body of the regulator.

The portable cylinder assembly torque tool includes a nut and a socket. The nut may be disassembled into two or more pieces such that they may fit around one or more valves on a body of the regulator. In order to fit around the valves protruding out from the body of the regulator, the nut may include one or more semi-circular shaped grooves or indentions such that the nut may fit around the body of the regulator without contacting the valves.

In addition to the nut, the portable cylinder assembly torque tool includes a socket that couples to the nut. The socket includes a cavity that has three sections: a top section, a middle section and a bottom section. The top section of the cavity may be coupled to a device such as a ratchet, a torque wrench or the like. The middle section of the cavity may be configured to avoid a case of the regulator. The bottom section of the cavity may be configured to couple to the nut while the nut is coupled around the body of the regulator. The bottom section may also include one or more semi-circular shaped grooves or indentions such that bottom section of the socket may fit around the body of the regulator without contacting the valves of the regulator. In one implementation, the outer wall of the nut may fit flush with the inner wall of the bottom section of the socket such that the socket may be used to apply a torque force on the nut. By applying a torque force on the nut, the body of the regulator may be coupled to the portable cylinder without altering the torque value between the case of the regulator and the body of the regulator.

The portable cylinder assembly torque tool may be used to couple the body of the regulator to the portable cylinder at a specified torque value without altering the torque value between the case of the regulator and the body of the regulator. In a first step, the nut may be coupled around the body of the regulator such that the nut avoids the valves protruding out from the regulator. Then, the socket may be coupled to the nut such that the socket avoids the case of the regulator and the valves protruding out from the regulator. In one implementation, the outer wall of the nut may fit flush with the inner wall of the bottom section of the socket. Next, a device, such as a ratchet, may be coupled to the socket, and used to apply a torque force to the socket. In this manner, the portable cylinder assembly torque tool may be used to couple the body of the regulator to the portable cylinder without altering the torque value between the case of the regulator and the body of the regulator.

Various implementations of the portable cylinder assembly torque tool and various techniques for using same will now be described in more detail with reference to FIGS. 1-8 and in the following paragraphs.

FIG. 1A illustrates a bottom view of a socket 100 for a portable cylinder assembly torque tool in accordance with implementations of various technologies described herein. The socket 100 includes a cavity that is composed of three sections: a top section 130, a middle section 120 and a bottom section 110 (shown in FIGS. 1B-1C). In one implementation, the top section 130 of the socket 100 may be a square hole that may be used to couple the socket 100 to a device configured to apply a torque force to the socket 100. In one implementation the device may include any standard ratchet, socket wrench or the like. In one implementation, the top section 130 may be shaped as a square such that a square fitting on a standard ratchet may be inserted into the top section 130. Typically, the square fitting on the ratchet contains a spring loaded ball detent mechanism to keep sockets in place. Accordingly, the top section 130 may include an indention for holding the spring loaded ball detent mechanism, thereby keeping the socket 100 in place.

The socket 100 also includes one or more grooves 140. The grooves 140 may be one or more indentions or carvings on the wall of the socket 100 so that the socket 100 may fit around one or more valves protruding from a regulator. Additional details pertaining to the grooves 140 are provided below with reference to FIGS. 1B, 1C, 6 and 7.

Figure 1B:
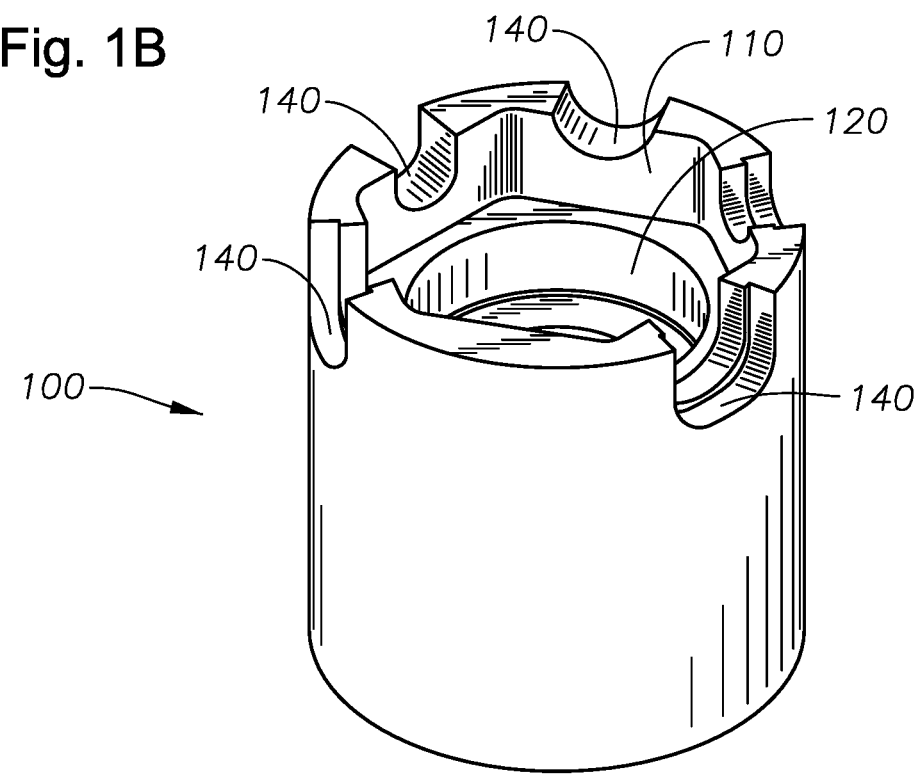
FIG. 1B illustrates a perspective view of a socket for a portable cylinder assembly torque tool in accordance with implementations of various technologies described herein.

FIG. 1B illustrates a perspective view of the socket 100 in accordance with implementations of various technologies described herein. As shown in FIG. 1B, the socket 100 includes a bottom section 110 and a middle section 120. The grooves 140 are part of the bottom section 110. Each individual groove 140 may be shaped such that each groove 140 avoids its respective valve protruding from the regulator. Since each respective valve on the regulator may be a different size and shape, each groove 140 may also be sized differently. In one implementation, each groove 140 may be shaped as a semi-circle. Although in this implementation each groove 140 has been described as being shaped as a semi-circle, it should be noted that in other implementations each groove 140 may be shaped differently so long as the socket 100 avoids contact with the valves of the regulator.

In one implementation, the bottom section 110 may be hexagonal in shape and may be configured to couple to a nut that is also hexagonal in shape. The nut will be described in more detail with reference to FIGS. 2A and 2B. Although in this implementation the bottom section 110 is described as being hexagonal in shape, it should be noted that in other implementations the bottom section 110 may be shaped differently so long as the shape of the bottom section 110 matches the shape of the nut.

The middle section 120 may be circular in shape and may be configured to avoid contacting or touching a case of a regulator. The case of the regulator will be described in more detail with reference to FIGS. 3-7. Although in this implementation the middle section is described as being circular in shape, it should be noted that in other implementations the middle section 120 may be shaped differently so long as the middle section avoids contact with the case of the regulator.

Figure 1C:
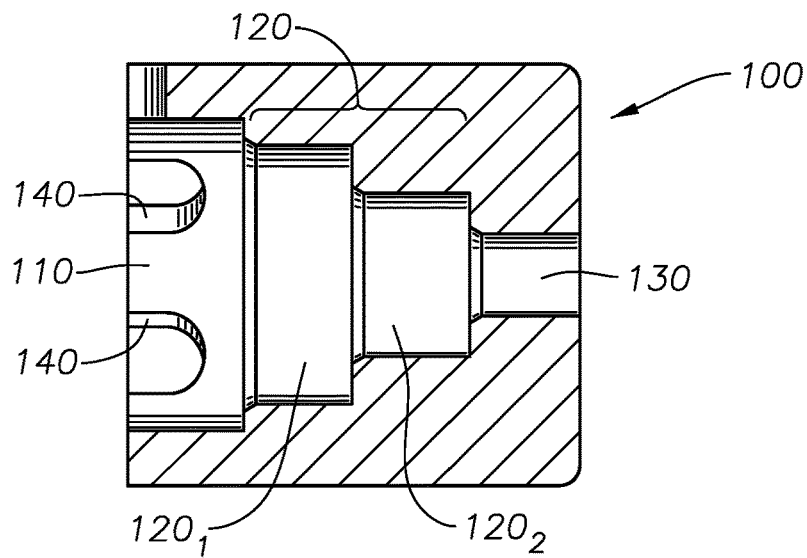
FIG. 1C illustrates a cross-sectional view of a socket for a portable cylinder assembly torque tool in accordance with implementations of various technologies described herein.

FIG. 1C illustrates a cross-sectional view of the socket 100 in accordance with implementations of various technologies described herein. In particular, FIG. 1C illustrates the bottom section 110, the middle section 120 and the top section 130 of the socket 100. As mentioned above, the bottom section 110 may include grooves 140 and the top section 130 may be coupled to a device, such as a ratchet. Generally, the inner wall of the bottom section 110 has a larger radius than the inner wall of the middle section 120, and the inner wall of the middle section 120 has a larger radius than the inner wall of the top section 130.

In one implementation, the middle section 120 may include two or more sub-sections (e.g., sub-section $120_1$ and sub-section $120_2$). As such, the sub-sections in the middle section 120 may be configured to avoid different parts of the case of the regulator. For example, the sub-section $120_1$ may be configured to avoid a hexagonal portion of the case and the sub-section $120_2$ may be configured to avoid a cylindrical portion of the case. The hexagonal portion and the cylindrical portion of the case of the regulator will be described in more detail with reference to FIG. 3. Although the middle section 120 is shown as having two subsections, it should be understood that in some implementations the middle section 120 may only have one section with one radius sufficient to avoid contacting both parts of the case.

Figure 2A:
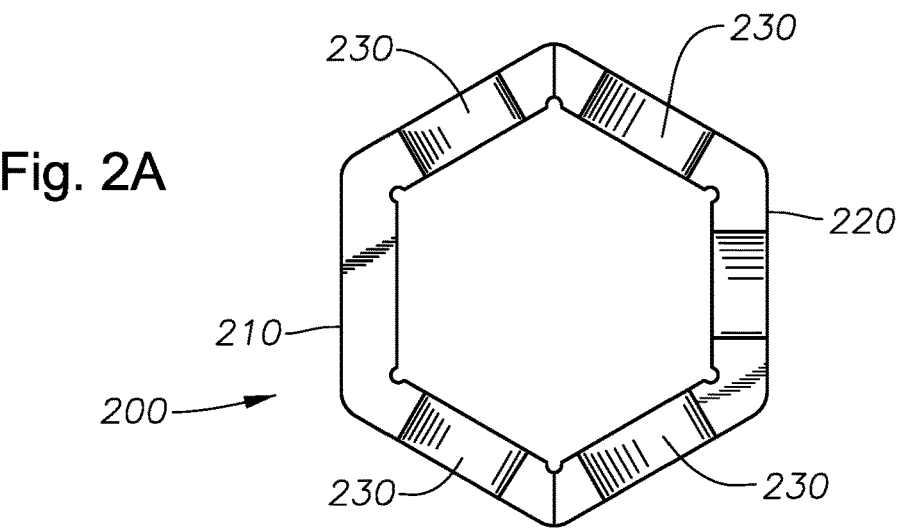
FIG. 2A illustrates a bottom view of a nut for a portable cylinder assembly torque tool in accordance with implementations of various technologies described herein.
Figure 2B:
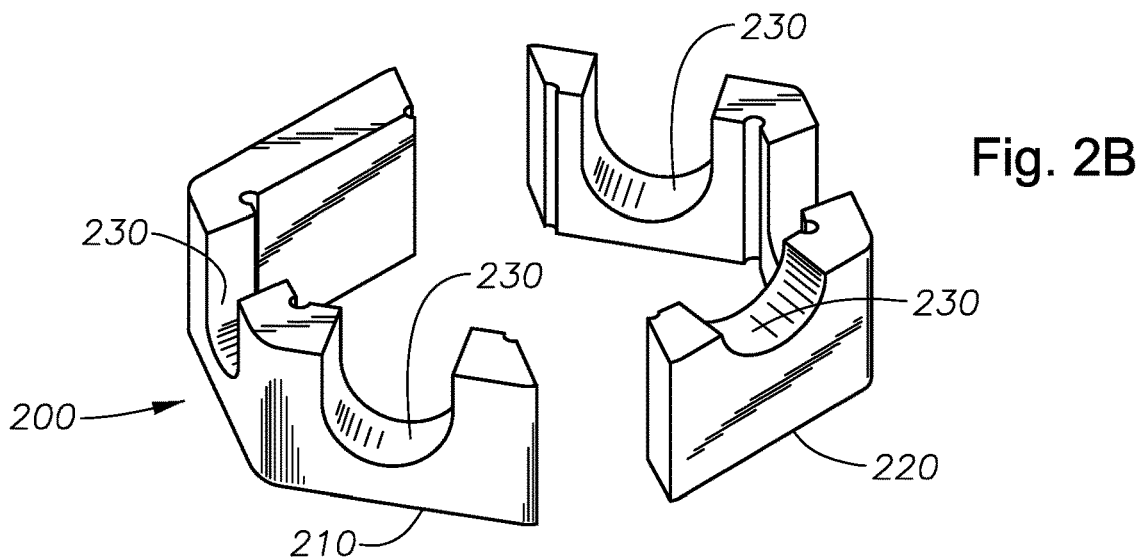
FIG. 2B illustrates a perspective view of a nut for a portable cylinder assembly torque tool in accordance with implementations of various technologies described herein.

FIG. 2A illustrates a bottom view of a nut 200 for a portable cylinder assembly torque tool in accordance with implementations of various technologies described herein. The nut 200 may include two or more pieces that may be coupled together to form the nut 200. FIG. 2A illustrates one implementation where the nut 200 includes two pieces: a left piece 210 and a right piece 220. In this implementation, the left piece 210 and the right piece 220 may each be shaped as a half-hexagon. FIG. 2B illustrates a perspective view of the left piece 210 and the right piece 220. As shown in FIG. 2B, the left piece 210 may include three sides of a hexagon and the right piece 220 may include the other three sides of the hexagon. In one implementation, the left piece 210 may include a male portion and the right piece 220 may include a female portion such that the left and right pieces may be coupled together to form the nut 200. In another implementation, the right piece 220 may include the male portion and the left piece 210 may include the female portion.

Figure 2C:
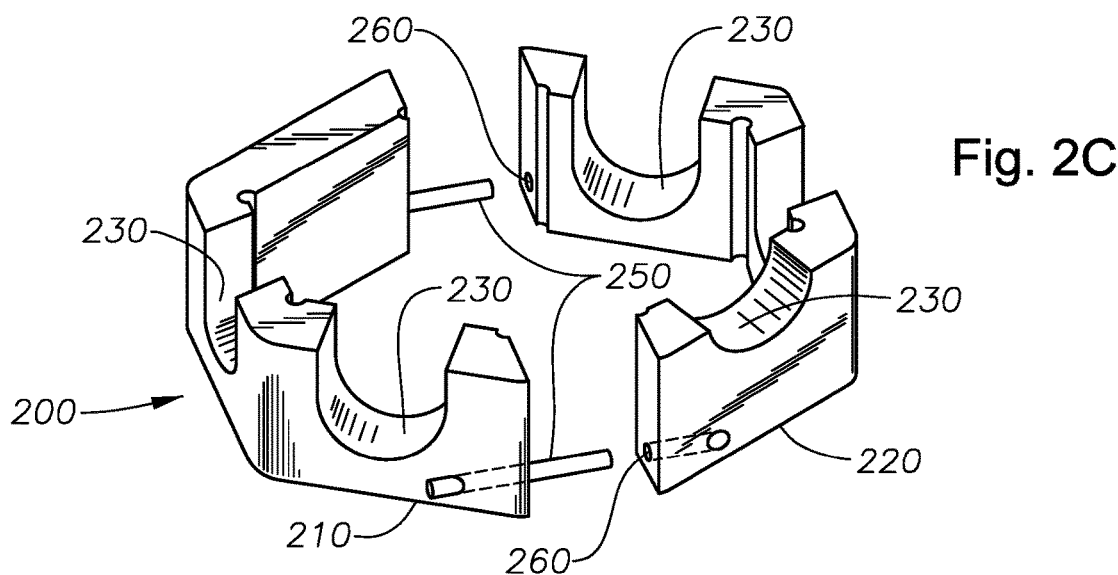
FIG. 2C illustrates a perspective view of a nut for a portable cylinder assembly torque tool with a pin in accordance with implementations of various technologies described herein.

FIG. 2C illustrates a perspective view of the left piece 210 and the right piece 220 coupled together with a pin 250. As shown in FIG. 2C, the left piece 210 may include three sides of a hexagon and the right piece 220 may include the other three sides of the hexagon. In one implementation, the left piece 210 and the right piece 220 may each include a hole 260 at each of its ends. The holes 260 may align together when the left piece 210 and the right piece 220 are coupled together. In one implementation, the pin 250 may be inserted through the hole 260 when the left piece 210 and the right piece 220 are coupled together. The pin 250 may secure the coupling between the left piece 210 and the right piece 220 to form the nut 200. Although the nut 200 has been described as being shaped as a hexagon, it should be noted that in some implementations the nut 200 may be shaped differently so long as the shape of the nut 200 matches the shape of the body of the regulator and the bottom section 110 of the socket 100.

Like the socket 100, the nut 200 may also include one or more grooves 230. The grooves 230 may have one or more indentions or carvings such that the nut 200 may fit around one or more valves protruding out of a regulator. In one implementation, each groove 230 may be shaped as a semi-circle such that the valves protruding out from a regulator may fit inside each groove 230. Each individual groove 230 may also be independently shaped such that each groove 230 avoids contact with its respective valve of the regulator. Although each groove 230 has been described as being shaped as a semi-circle, it should be noted that in some implementations each groove 230 may be shaped differently so long as the nut 200 avoids contacting the valves protruding out from the regulator. Additional details as to the grooves 230 are provided below with reference to FIGS. 4-5.

Figure 3:
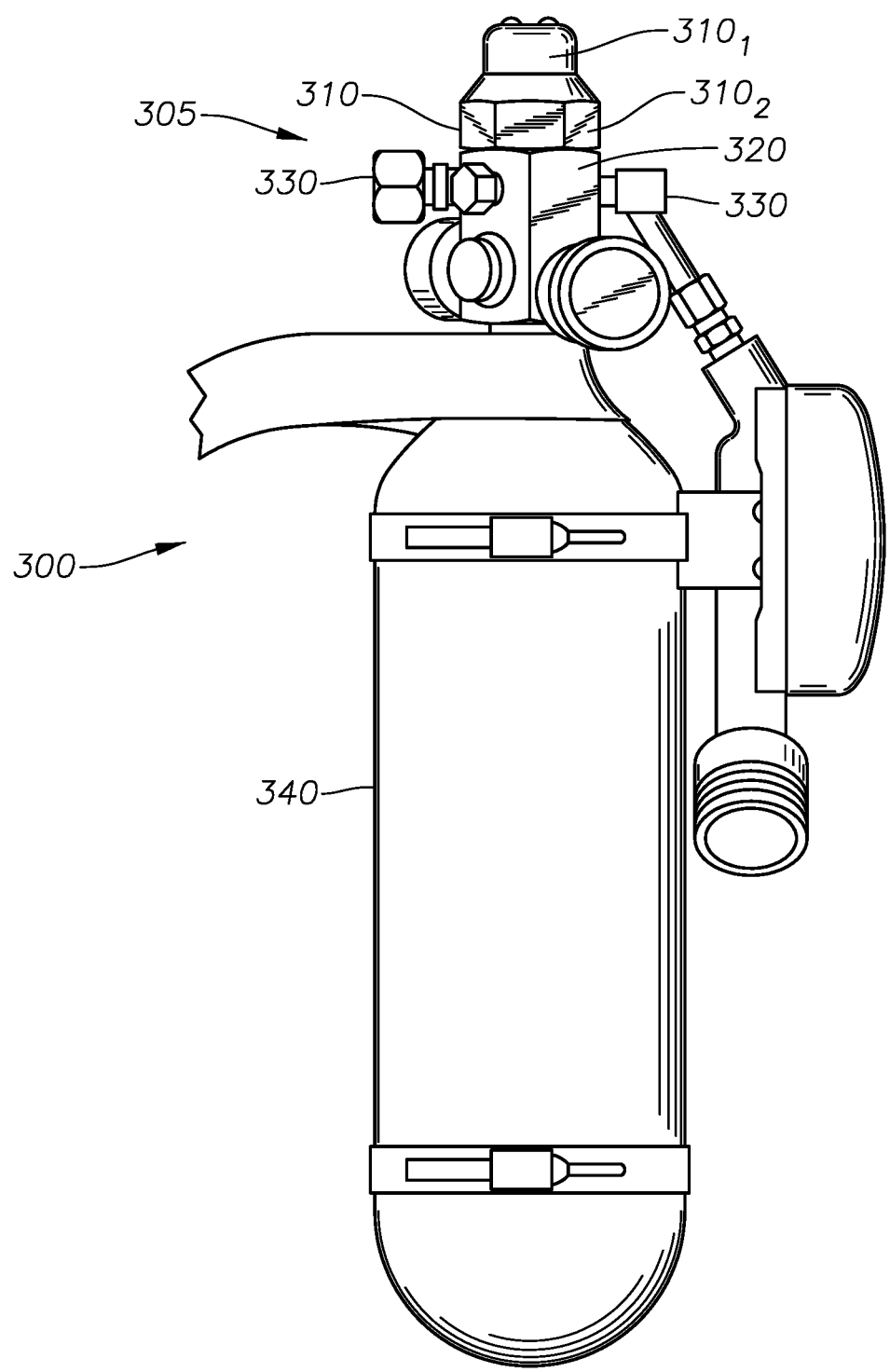
FIG. 3 illustrates a side view of a portable cylinder assembly that may be used with implementations of various technologies described herein.

FIG. 3 illustrates a side view of a portable cylinder assembly 300 that may be used with implementations of various technologies described herein. The portable cylinder assembly 300 includes a regulator 305 and a cylinder 340. The regulator 305 has a case 310 and a body 320. The case 310 is coupled to the body 320 at a first predetermined torque value. Similarly, the body 320 is coupled to the cylinder 340 at a second predetermined torque value. The body 320 may include one or more valves 330 that may control the flow of gas from the cylinder 340. In one implementation, the cylinder 340 may store a compressed gas, such as oxygen and the like. Although the body 320 has been described as including valves 330, it should be noted that in some implementations the body 320 may include other instruments, such as gauges and the like. Accordingly, the grooves 140 of the socket 100 and the grooves 230 of the nut 200 may be designed to avoid the valves 330 and any other instruments that may be protruding out from the body of the regulator 305.

In one implementation, the case 310 of the regulator may include a cylindrical portion $310_1$ and a hexagonal portion $310_2$. In one implementation, the hexagonal portion $310_2$ may be shaped similar to that of the body 320 of the regulator. At times, the hexagonal portion $310_2$ of the case 310 is evenly aligned with the hexagonal surface of the body 320. In this situation, a conventional socket may be used to torque the body 320 of the regulator to the cylinder 340. However, the conventional socket may not provide an adequate torque force on the body 320, because the valves 330 may obstruct the conventional socket's grip on the body 320 of the regulator. Also, while using the conventional socket to torque the body 320 to the cylinder 340, the conventional socket may alter the torque value between the case 310 and the body 320 due to the lack of grip between the conventional socket and the body 320. Often times, however, the hexagonal portion $310_2$ of the case 310 is not evenly aligned with the hexagonal surface of the body 320, as illustrated in FIG. 3. In this case, the conventional socket may not be used to torque the body 320 to the cylinder 340, because the case 310 obstructs the conventional socket's access to the hexagonal surface of the body 320. For this reason, the socket 100 and the nut 200 (i.e., portable cylinder assembly torque tool) described herein may be used to torque the body 320 to the cylinder 340 without altering or interfering with the torque value between the case 310 and the body 320.

Figure 4:
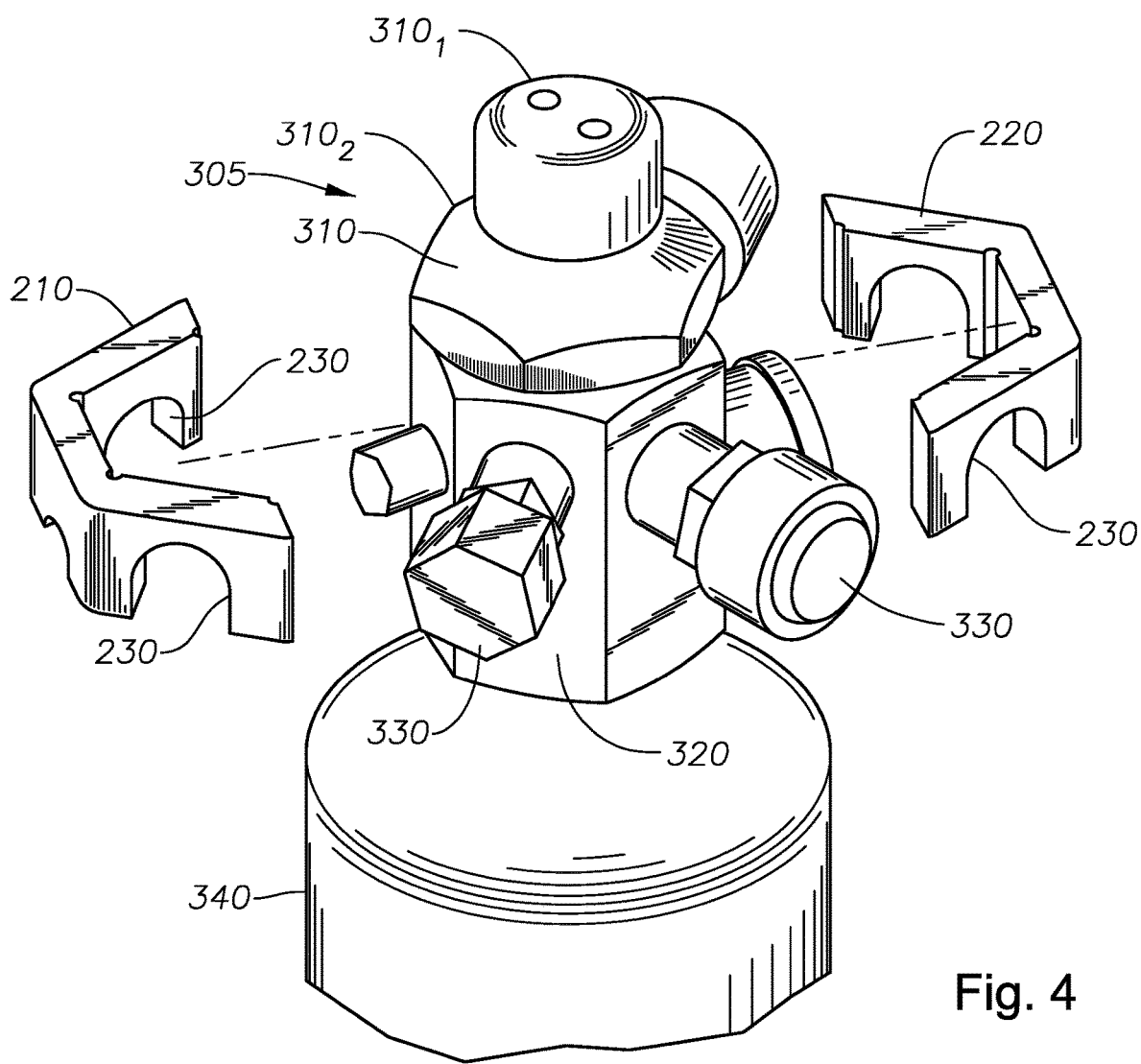
FIG. 4 illustrates a perspective view of a left piece and a right piece of a nut for the portable cylinder assembly torque tool to be used on a regulator on a portable cylinder assembly in accordance with implementations of various technologies described herein.

FIG. 4 illustrates a perspective view of the left piece 210 and the right piece 220 of the nut 200 to be used on the regulator 305 in accordance with implementations of various technologies described herein. The following description is also made with reference to the nut 200 in FIGS. 2A-2B and 3. As shown in FIG. 4, the grooves 230 of the left piece 210 and the grooves 230 of the right piece 220 of the nut 200 are aligned with the valves 330 such that the nut 200 may avoid contact with the valves 330 when it is coupled to the hexagonal surface of the body 320.

Figure 5:
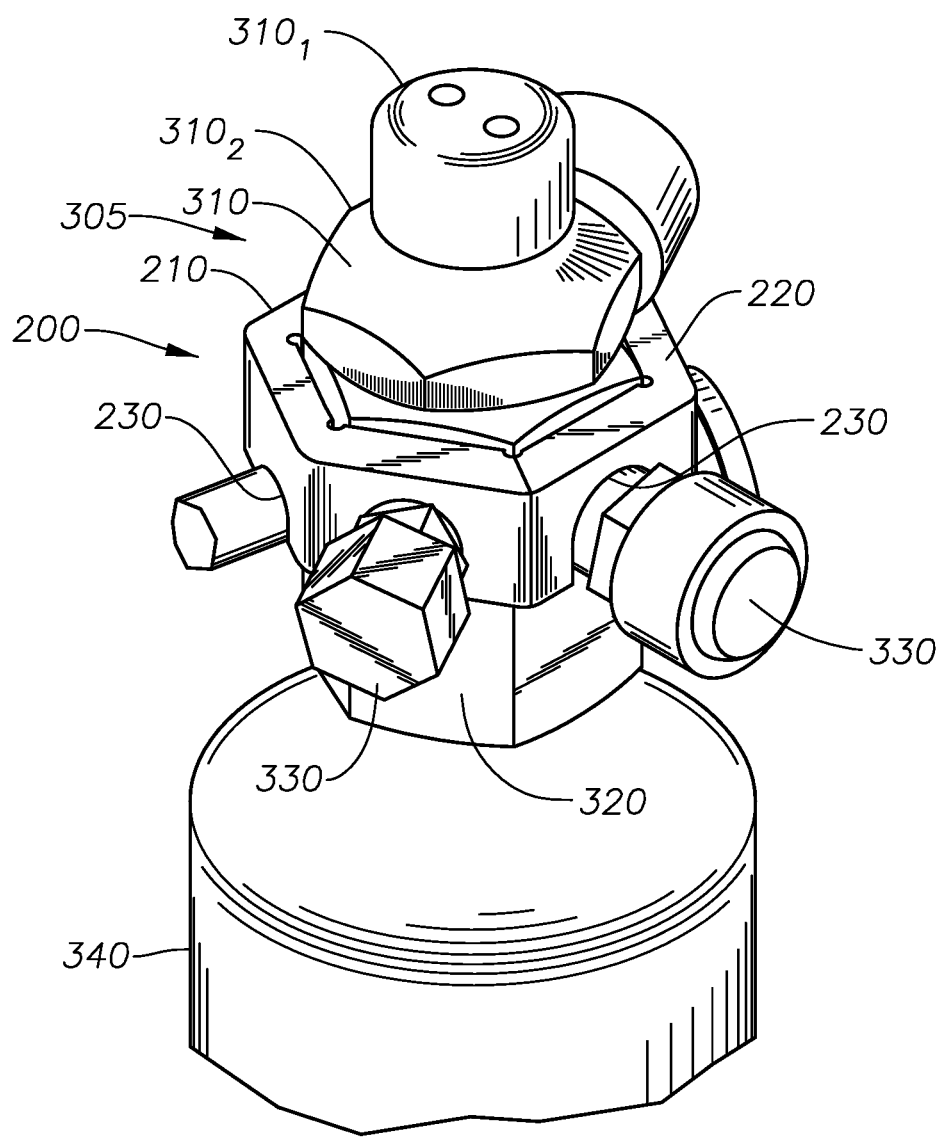
FIG. 5 illustrates a perspective view of a nut for a portable cylinder assembly torque tool coupled to a regulator on a portable cylinder assembly in accordance with implementations of various technologies described herein.

The nut 200 may be shaped such that it may couple to the body 320 of the regulator 305. As such, the internal wall of the nut 200 may be configured to fit flush against the external wall of the body 320 of the regulator 305 and the radius of the internal wall of the nut 200 is substantially the same as the radius of the external wall of the body 320. Further, the width of the nut 200 is configured such that when the nut 200 is coupled to the body 320 of the regulator 305, the outer wall of the nut 200 has a larger radius than the outer wall of the hexagonal portion $310_2$ of the case 310. In this manner, the socket 100 is able to couple with the nut 200 without touching the case 310 and interfering with the torque value between the case 310 and the body 320. FIG. 5 illustrates how the nut 200 fits around the body 320 of the regulator 305 while avoiding the valves 330 using the grooves 230. As also illustrated in FIG. 5, the outer wall of the nut 200 has a larger radius than the outer wall of the hexagonal portion $310_2$ of the case 310, which will enable the socket 100 to couple to the nut 200 without touching the case 310.

Figure 6:
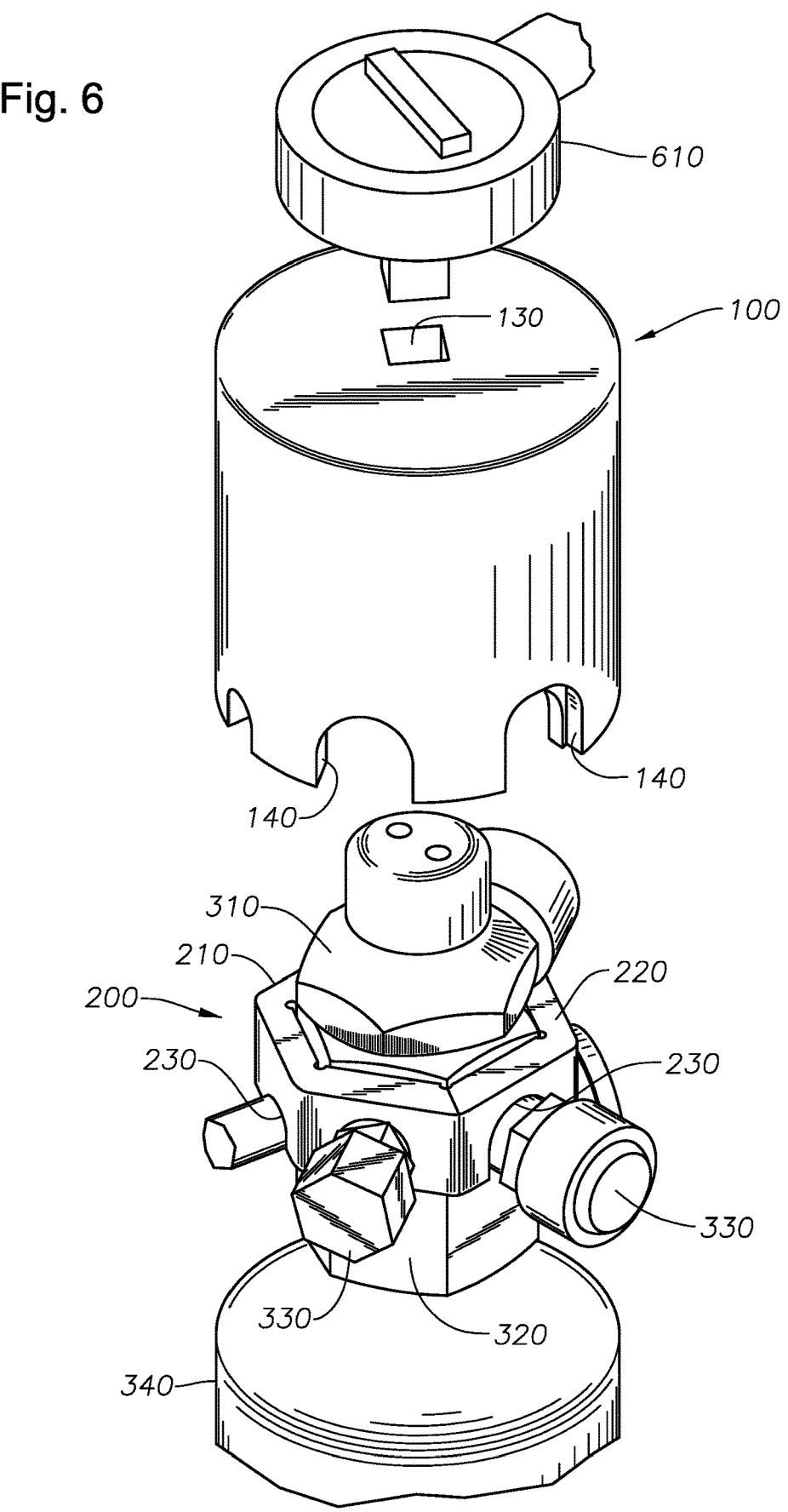
FIG. 6 illustrates a perspective view of a nut for a portable cylinder assembly torque tool coupled to a hexagonal surface of a body of a regulator on a portable cylinder assembly and a socket for the portable cylinder assembly torque tool to be used on the nut in accordance with implementations of various technologies described herein.

FIG. 6 illustrates a perspective view of the nut 200 coupled to the hexagonal surface of the body 320 of the regulator 305 and a socket 100 to be used on the nut 200 in accordance with implementations of various technologies described herein. As shown in FIG. 6, the grooves 140 of the socket 100 are aligned with the valves 330 such that the socket 100 may avoid contact with the valves 330 when coupled to the nut 200. Further, the top section 130 may be coupled to a device 610 such that the device 610 may torque the body 320 of the regulator 305 to the cylinder 340 using the socket 100 and the nut 200. Additional details describing how the device 610 may be used to torque the body 320 of the regulator 305 to the cylinder 340 will be described in more detail with reference to FIGS. 7-8 below. In one implementation, the device 610 may be a ratchet, a socket wrench and the like.

Figure 7:
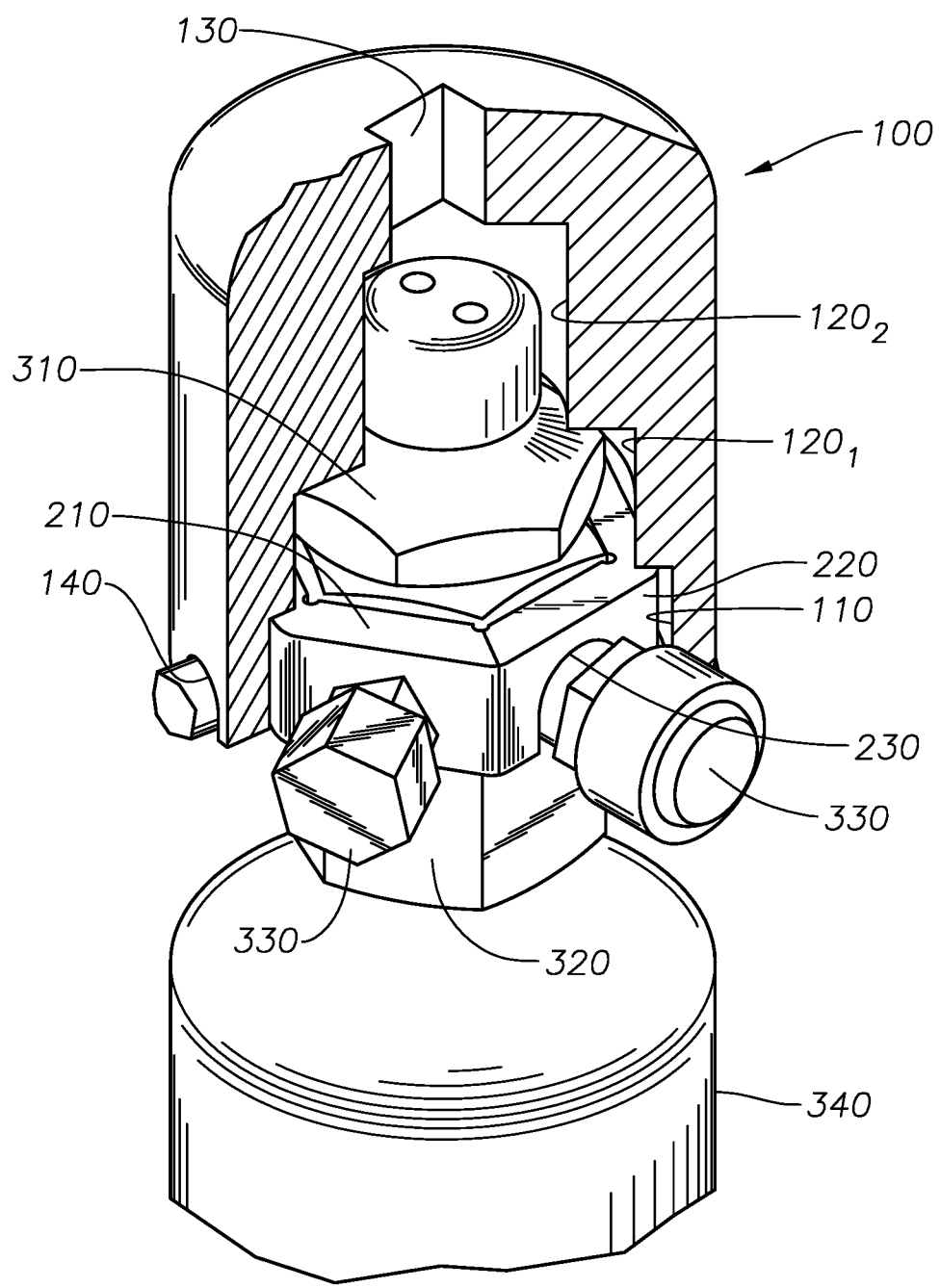
FIG. 7 illustrates a cross-sectional view of a socket for a portable cylinder assembly torque tool coupled to a nut for the portable cylinder assembly torque tool in accordance with implementations of various technologies described herein.

FIG. 7 illustrates a cross-sectional view of the socket 100 coupled to the nut 200 for the portable cylinder assembly torque tool in accordance with implementations of various technologies described herein. The following description of the cross-sectional view of the regulator is also made with reference to the socket 100 in FIGS. 1A-1C and the nut 200 in FIGS. 2A-2B. As shown in FIG. 7, the outer wall of the nut 200 is flush with the inner wall of the bottom section 110 of the socket 100. FIG. 7 also illustrates how the grooves 140 are designed to avoid contact with the valves 330 when the socket 100 is coupled to the nut 200.

The bottom section 110 of the socket 100 is designed to be coupled to the nut 200. In one implementation, the radius of the inner wall of the bottom section 110 is substantially close to the radius of the outer wall of the nut 200. In this manner, the bottom section 110 may fit flush against the nut 200 so that the socket 100 may torque the body 320 via the nut 200.

The middle section 120 of the socket 100 is designed to avoid contact with the case 310. In one implementation, the radius of the inner wall of the middle section 120 is greater than the outer wall of the case 310 but less than the radius of the outer wall of the nut 200. The radius of the inner wall of the middle section 120 is designed to be greater than the outer wall of the case 310 so that the middle section 110 may avoid touching the case 310. The radius of the inner wall of the middle section 120 is designed to be less than the radius of the outer wall of the nut 200 so that the bottom wall of the middle section 120 may rest on the top surface of the nut 200, rather than resting on the valves 330. In this manner, the socket 100 may sufficiently grip the nut 200 using the bottom section 110 without interfering with the valves 330 or the case 310. If the bottom wall of the middle section 120 does not rest on the nut 200, the grooves 140 would consequently rest on the valves 330 when the socket 100 is coupled to the nut 200. In this case, when a torque force is applied to the socket 100, the socket 100 will push the valves 330 as opposed to just the nut 200, which may cause damage to the valves 330.

After the socket 100 is coupled to the nut 200 as shown in FIG. 7, the device 610 may be coupled to the top section 130 of the socket 100 and used to apply a torque force to the socket 100. In this manner, the socket 100 and the nut 200 may be used to torque the body 320 of the regulator 305 to the cylinder 340 without altering the torque value between the case 310 of the regulator 305 and the body 320 of the regulator 305. The method for torquing the body 320 of the regulator 305 to the cylinder 340 using the socket 100 and the nut 200 is described in more detail with reference to FIG. 8 below.

Figure 8:
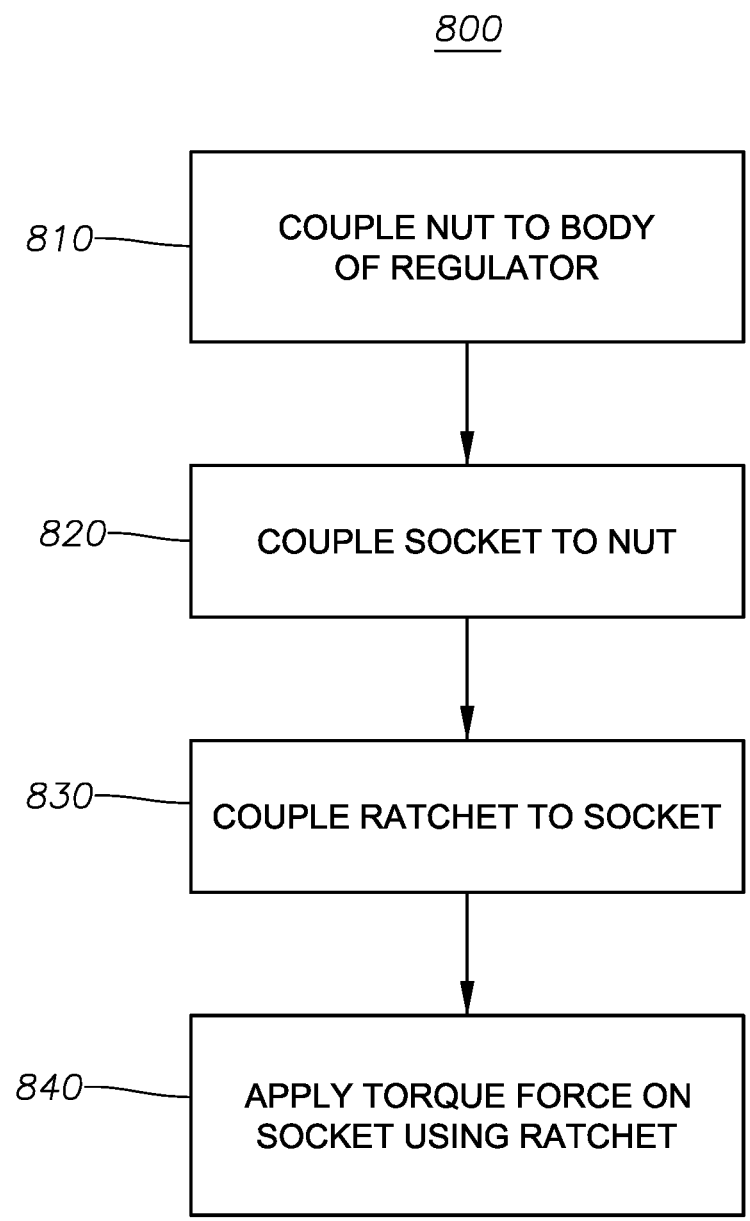
FIG. 8 illustrates a flow diagram of a method for torquing a regulator to a portable cylinder assembly using a portable cylinder assembly torque tool according to one or more implementations of various techniques described herein.

FIG. 8 illustrates a flow diagram of a method 800 for torquing a regulator to a portable cylinder assembly using a portable cylinder assembly torque tool according to one or more implementations of various techniques described herein. The following description of method 800 is made with reference to the socket 100 in FIGS. 1A-1C and 4-7 and the nut 200 in FIGS. 2A-2B and 4-7. At step 810, the nut 200 may be coupled to the body 320 of the regulator as shown in FIGS. 4-5. In one implementation, the nut 200 may be disassembled into two or more pieces such that the nut 200 may fit flush with the body 320 of the regulator. When the nut 200 is coupled to the body 320 of the regulator, the nut 200 should avoid contact with the valves 330 via its grooves 230.

At step 820, the socket 100 may be placed on the regulator such that the socket 100 couples to the nut 200, as shown in FIGS. 6-7. As mentioned above, the outer wall of the nut 200 may be flush with the inner wall of the bottom section 110 of the socket 100 when the socket 100 is coupled to the nut 200. Also, when the socket 100 is coupled to the nut 200, the socket should avoid contact with the valves 330 via its grooves 140 and avoid contact with the case 310 of the regulator via its middle section 120.

At step 830, the device 610 may be coupled to the top section 130 of the socket 100.

At step 840, a torque force may be applied on the socket 100 using the device 610 such that the torque value between the body 320 of the regulator and the cylinder 340 is altered. By applying the torque force on the socket 100, the socket 100 applies the torque force on the nut 200 which in turn applies the torque force on the body 320 of the regulator without applying any force on the case 310 of the regulator.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for manufacturing a socket for torquing a body of a regulator of a portable cylinder assembly, comprising:
   creating a cavity through the socket;
   defining a hole at a top section of the cavity, wherein the hole is configured to couple to a device that applies a torque force on the socket;
   defining a middle section of the cavity, wherein the middle section is coaxial with the hole, comprises a through-hole having a circular cross section and is configured to avoid contacting a case of the regulator; and
   defining a bottom section of the cavity having an inner wall configured to mate with an outer wall of a nut, wherein the bottom section is coaxial with the hole and the through hole.

2. The method of claim 1, wherein the inner wall of the bottom section and the outer wall of the nut are hexagonal in shape.

3. The method of claim 1, wherein the bottom section comprises one or more grooves configured to avoid contacting one or more valve assemblies on the body of the regulator.

4. The method of claim 3, wherein the nut comprises one or more grooves configured to avoid contacting one or more valve assemblies on the body of the regulator.

5. The method of claim 4, wherein the one or more grooves of the bottom section comprises a profile substantially the same as the one or more grooves of the nut.

6. The method of claim 1, wherein the nut comprises one or more grooves configured to avoid contacting one or more valve assemblies on the body of the regulator.

7. The method of claim 1, wherein the hole comprises a square cross-section.

8. The method of claim 1, wherein defining the middle section comprises:
   defining a narrow section configured to surround a cylindrical portion of the case; and
   defining a wide section configured to surround a hexagonal portion of the case.

9. The method of claim 8, wherein the inner wall comprises a cross section having a negative profile of the hexagonal case.

10. The method of claim 9, further comprising:
    sizing the inner wall to be in substantial contact with the hexagonal case on all sides of a circumference of the hexagonal case.

11. A method for manufacturing a socket for torquing a body of a regulator of a portable cylinder assembly, comprising:
    defining a hole at a top section of the socket, wherein the hole is configured to couple to a device that applies a torque force on the socket;
    defining a middle cavity next to the hole, wherein the middle cavity is coaxial with the hole, comprises a through-hole having a circular cross section and is configured to avoid contacting a case of the regulator; and
    defining a bottom cavity next to the middle cavity having an inner wall configured to mate with an outer wall of a nut, wherein the bottom section is coaxial with the hole and the through hole.

12. The method of claim 11, wherein the inner wall of the bottom cavity and the outer wall of the nut are hexagonal in shape.

13. The method of claim 11, wherein the bottom cavity comprises one or more grooves configured to avoid contacting one or more valve assemblies on the body of the regulator.

14. The method of claim 13, wherein the nut comprises one or more grooves configured to avoid contacting one or more valve assemblies on the body of the regulator.

15. The method of claim 14, wherein the one or more grooves of the bottom cavity comprises a profile substantially the same as the one or more grooves of the nut.

16. The method of claim 11, wherein the nut comprises one or more grooves configured to avoid contacting one or more valve assemblies on the body of the regulator.

17. The method of claim 11, wherein the hole comprises a square cross-section.

18. The method of claim 11, wherein defining the middle cavity comprises:
    defining a narrow section configured to surround a cylindrical portion of the case; and
    defining a wide section configured to surround a hexagonal portion of the case.

19. The method of claim 18, wherein the inner wall comprises a cross section having a negative profile of the hexagonal case.

20. The method of claim 19, further comprising:
    sizing the inner wall to be in substantial contact with the hexagonal case on all sides.

* * * * *